United States Patent
Kajiyama et al.

(10) Patent No.: US 7,609,692 B2
(45) Date of Patent: Oct. 27, 2009

(54) METHOD AND APPARATUS FOR CONTROLLING ROUTE IN NETWORK

(75) Inventors: Hiromitsu Kajiyama, Osaka (JP); Jiro Nakata, Osaka (JP); Nobuo Shirai, Osaka (JP)

(73) Assignee: Fujitsu Limited, Kawasaki (JP)

( * ) Notice: Subject to any disclaimer, the term of this patent is extended or adjusted under 35 U.S.C. 154(b) by 518 days.

(21) Appl. No.: 11/472,986

(22) Filed: Jun. 23, 2006

(65) Prior Publication Data

US 2007/0217410 A1 Sep. 20, 2007

(30) Foreign Application Priority Data

Mar. 15, 2006 (JP) .............................. 2006-071336

(51) Int. Cl.
*H04L 12/56* (2006.01)
(52) U.S. Cl. ...................... 370/389; 370/392; 370/401; 709/223
(58) Field of Classification Search ................. 370/254, 370/389, 392, 400, 401; 709/223–226, 242–244
See application file for complete search history.

(56) References Cited

U.S. PATENT DOCUMENTS

| | | | | |
|---|---|---|---|---|
| 5,841,775 A | * | 11/1998 | Huang | 370/422 |
| 6,028,848 A | * | 2/2000 | Bhatia et al. | 370/257 |
| 6,603,758 B1 | * | 8/2003 | Schmuelling et al. | 370/352 |
| 6,665,702 B1 | * | 12/2003 | Zisapel et al. | 718/105 |
| 6,801,528 B2 | * | 10/2004 | Nassar | 370/389 |
| 7,269,143 B2 | * | 9/2007 | Datta et al. | 370/254 |
| 7,472,179 B2 | * | 12/2008 | Tarui et al. | 709/223 |
| 7,477,648 B2 | * | 1/2009 | Ota et al. | 370/401 |
| 2002/0196802 A1 | * | 12/2002 | Sakov et al. | 370/432 |
| 2005/0201302 A1 | * | 9/2005 | Gaddis et al. | 370/254 |

FOREIGN PATENT DOCUMENTS

JP 2005-057487 3/2005

* cited by examiner

*Primary Examiner*—Michael J Moore, Jr.
*Assistant Examiner*—Duc T Duong
(74) *Attorney, Agent, or Firm*—Staas & Halsey LLP

(57) ABSTRACT

A route controlling apparatus is provided on a center side in a network having a carrier-redundant configuration in which the center side and a base side are connected using a plurality of different carriers, and includes a load distribution table that stores information for load distribution; and a controlling unit that creates, when data is received by a host on the center side from a host on the base side, a new entry in the load distribution table. In the new entry, a carrier selected for transmission of the data by a router on the base side is associated with an address of the host on the base side. The controlling unit refers to the entry to select the carrier as a route when data is to be transmitted from the host on the center side to the host on the base side.

15 Claims, 15 Drawing Sheets

| DESTINATION ADDRESS/ MASK LENGTH | GATEWAY ADDRESS | TRANSMISSION LINE | |
|---|---|---|---|
| 10.10.1.0/24 | G1 | L1 | |
| 10.10.1.0/24 | G2 | L2 | |
| 10.10.2.0/24 | G1 | L1 | |
| 10.10.2.0/24 | G2 | L2 | |
| | | | |

| TRANSMISSION ORIGIN ADDRESS | DESTINATION ADDRESS | GATEWAY ADDRESS | TRANSMISSION LINE |
|---|---|---|---|
| 10.10.0.1 | 10.10.1.1 | G2 | L2 |
| | | | |
| | | | |
| | | | |
| | | | |

| INAPPLICABLE BASE HOST IP ADDRESS |
|---|
| 10.10.1.1 |
|  |
|  |
|  |
|  |
|  |

| INAPPLICABLE CENTER HOST IP ADDRESS | INAPPLICABLE BASE HOST IP ADDRESS | TCP/UDP PORT NUMBER |
|---|---|---|
| 10.10.0.1 | 10.10.1.1 | 500 (UDP) |
|  |  |  |
|  |  |  |
|  |  |  |
|  |  |  |

| INAPPLICABLE CENTER HOST IP ADDRESS | INAPPLICABLE BASE HOST IP ADDRESS | TRANSMISSION ORIGIN TCP/UDP PORT NUMBER | DESTINATION TCP/UDP PORT NUMBER |
|---|---|---|---|
| ANY | ANY | 500 (UDP) | |
| | | | |
| | | | |
| | | | |
| | | | |
| | | | |

| INAPPLICABLE CENTER HOST IP ADDRESS | INAPPLICABLE BASE HOST IP ADDRESS | TRANSMISSION ORIGIN TCP/UDP PORT NUMBER | DESTINATION TCP/UDP PORT NUMBER |
|---|---|---|---|
| ANY | ANY | | 500 (UDP) |
| | | | |
| | | | |
| | | | |
| | | | |
| | | | |

| INAPPLICABLE CENTER HOST IP ADDRESS | INAPPLICABLE BASE HOST IP ADDRESS | TRANSMISSION ORIGIN TCP/UDP PORT NUMBER | DESTINATION TCP/UDP PORT NUMBER |
|---|---|---|---|
| 10.10.0.1 | 10.10.1.1 | 500 (UDP) | 500 (UDP) |
| 10.10.0.1 | 10.10.2.1 | 30 (UDP) | |
| 10.10.0.2 | ANY | | 1000 (TCP) |
| ANY | ANY | | 125 (TCP) |
| | | | |
| | | | |

| TRANSMISSION ORIGIN ADDRESS | DESTINATION ADDRESS | GATEWAY ADDRESS | TCP/UDP PORT NUMBER | TRANSMISSION LINE |
|---|---|---|---|---|
| 10.10.0.1 | 10.10.1.1 | G2 | 500(UDP) | L2 |
| 10.10.0.2 | 10.10.1.2 | G2 | RTP | L2 |
| | | | | |
| | | | | |
| | | | | |

| INAPPLICABLE CENTER HOST IP ADDRESS | INAPPLICABLE BASE HOST IP ADDRESS | TRANSMISSION ORIGIN TCP/UDP PORT NUMBER | DESTINATION TCP/UDP PORT NUMBER |
|---|---|---|---|
| 10.10.0.1 | 10.10.1.1 | 500 (UDP) | 500 (UDP) |
| 10.10.0.1 | 10.10.2.1 | 30 (UDP) | |
| 10.10.0.2 | ANY | | 1000 (TCP) |
| ANY | ANY | | 125 (TCP) |
| 10.10.0.2 | 10.10.1.2 | RTP | RTP |
| | | | |

| CENTER HOST IP ADDRESS | BASE HOST IP ADDRESS | TRANSMISSION ORIGIN IP PROTOCOL NUMBER | DESTINATION IP PROTOCOL NUMBER |
|---|---|---|---|
| 10.10.0.2 | 10.10.1.2 | RTP | RTP |
| | | | |
| | | | |
| | | | |

METHOD AND APPARATUS FOR CONTROLLING ROUTE IN NETWORK

CROSS-REFERENCE TO RELATED APPLICATIONS

This application is based upon and claims the benefit of priority from the prior Japanese Patent Application No. 2006-071336, filed on Mar. 15, 2006, the entire contents of which are incorporated herein by reference.

BACKGROUND OF THE INVENTION

1. Field of the Invention

The present invention relates to a technology for controlling a route to be used in a network.

2. Description of the Related Art

Conventionally, a network design that improves the reliability of the network by connecting a center router with a base router using the network including plural carriers has been implemented. FIG. 23 illustrates a configuration having a duplicated carrier. In the configuration shown in FIG. 23, carrier services respectively having different contents for cost and band guarantee are combined to optimize a routing information protocol (ROI).

1. A service of a carrier A is assumed to be a service for which the cost is high and the band can not be widened, however, the band is guaranteed. 2. A service of a carrier B is assumed to be a service for which the cost is low and a wide band can be expected, however, the band is not guaranteed (best-effort type). By combining these two carriers respectively having different service contents, a network that guarantees the minimum band, can be expected a wide band, and is reliable as a whole, can be designed at a reasonable cost.

A center router 100 and base routers 101, in a network of a form formed by combining a plurality of these carriers, communicate communication data between the center side and the base side using either of the plurality of carrier lines A and B according to the situation. As a technique close to this configuration, multi-homing that connects the connection with the Internet using plural internet service provider (ISP) lines can be listed (for example, Japanese Patent Laid-Open No. 2005-57487).

According to the above configuration, both of the center router 100 and the base routers 101 distribute the load corresponding to the load state of the connection lines of the carriers A and B to which the center router 100 and the base router 101 are connected. For example, the load state of the connection line of a router is always monitored and new communication is executed using the carrier A or B having a smaller load. This new communication is executed in packets, in combinations of hosts, in new sessions, etc.

However, data transmitted from the center side to the base side are distributed corresponding not to the load state of the lines on the base side but to the load state of the lines on the center side. In general, the lines on the center side are designed to have a band (line capacity) with sufficient availability. As described above, when the data are distributed corresponding to the load state of the lines on the center side, the optimal distribution by the center router 100 can not be realized because the load state of the lines on the base side can not be considered.

In another distribution method, the distribution ratio for data from the center router 100 to the base routers 101 is fixedly determined. In this method, although distribution considering the difference in the contracted band of the connection lines between the carriers A and B of the base routers 101 is enabled, the optimal distribution corresponding to the actual state of the connection lines of the carriers of the base routers 101 can not be realized. Especially when the carriers A and B respectively having a service conflicting with each other as in the items 1 and 2 above are selected, the distribution is insufficient when the distribution is formed only by assigning fixedly in advance because any fixed value can not be guaranteed in the band on the lines of the carrier B.

SUMMARY OF THE INVENTION

It is an object of the present invention to at least solve the above problems in the conventional technologies.

A route controlling apparatus according to one aspect of the present invention is provided on a center side in a network having a carrier-redundant configuration in which the center side and a base side are connected using a plurality of different carriers so that communication is achieved therebetween. The route controlling apparatus includes a load distribution table configured to store information for load distribution; and a controlling unit configured to create, when data is received by a host on the center side from a host on the base side, a new entry in the load distribution table, the new entry in which a carrier selected for received data by a router on the base side is associated with an address of the host on the base side, and configured to refer to the entry to select the carrier as a route when data is to be transmitted from the host on the center side to the host on the base side.

A route controlling method according to another aspect of the present invention is of a route controlling apparatus provided on a center side in a network having a carrier-redundant configuration in which the center side and a base side are connected using a plurality of different carriers so that communication is achieved therebetween. The route controlling method includes creating, when data is received by a host on the center side from a host on the base side, a new entry in a load distribution table, the new entry in which a carrier selected for received data by a router on the base side is associated with an address of the host on the base side; referring to the entry; and selecting the carrier as a route when data is to be transmitted from the host on the center side to the host on the base side.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a schematic for illustrating a basic routing table provided in a center router;

FIG. 4 is a schematic for illustrating an example of a load distribution routing table provided in the center router;

FIG. 12 is a schematic for illustrating another example of the load-distribution inapplicability table;

FIG. 13 is a schematic for illustrating another example of the load-distribution inapplicability table;

FIG. 14 is a schematic for illustrating another example of the load-distribution inapplicability table;

FIG. 19 is a schematic for illustrating an example of a load distribution routing table according to the fourth embodiment;

FIG. 20 is a schematic for illustrating an example of a load-distribution inapplicability table according to the fourth embodiment;

FIG. 21 is a schematic for illustrating an IP protocol registration table according to the fourth embodiment;

DETAILED DESCRIPTION OF THE PREFERRED EMBODIMENTS

Exemplary embodiments according to the present invention will be explained in detail below with reference to the accompanying drawings.

According to the embodiments, link load distribution is performed for communication between a center and bases using plural carrier lines in a system having a carrier-redundant configuration. The link-load distribution is executed by a center router considering a load state of the lines in base routers. The present invention employs the following items 1 to 3 as preconditions.

1. The network is an intranet connecting a center and bases of an organization.
2. The connections between the center and the bases are configured to be carrier-redundant.
3. The communication protocol is, for example, transmission control protocol/internet protocol (TCP/IP).

Figure 1:
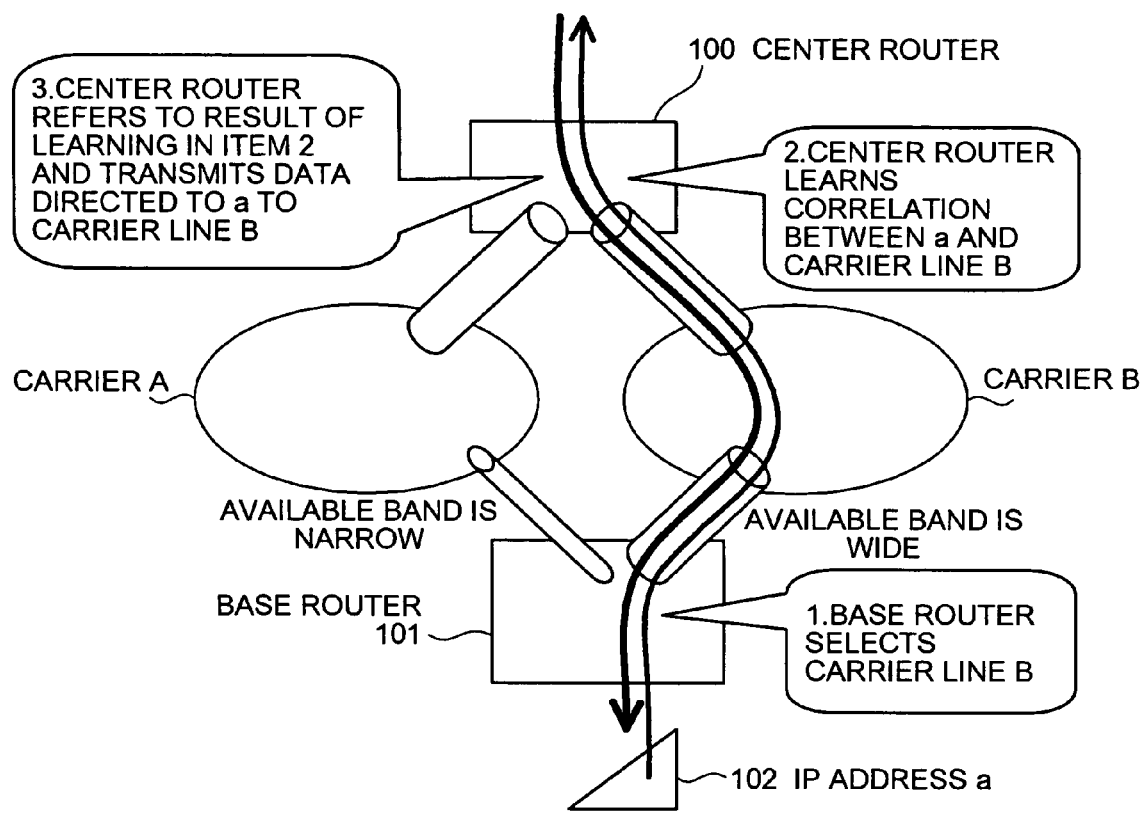
FIG. 1 is a schematic of a route controlling apparatus according to embodiments of the present invention.

FIG. 1 is a schematic of a route controlling apparatus according to embodiments of the present invention. The link-load distribution (load distribution) by the center router 100 as a route controlling apparatus is executed conforming to the control of the load distribution on the base router 101 side. The base routers 101 are assumed to be able to grasp using the existing technique the load state of the lines of the carriers A, B, etc., that these base routers 101 are connected with.

An outline of the route control by the center router 100 is as follows:

1. Each of the base routers 101 transmits data on the optimal (light-loaded) carrier line A or B.
2. The center router 100 learns the correlation between the originator IP address of an IP packet received from the base router 101 and the carrier line A or B.
3. Data communication from the center to the bases is transmitted to the carrier line A or B corresponding to the relevant IP address, referring to the result of the learning of the item 2.

According to the above control, for transmitting data from the center side to the base side, the center router 100 transmits the data through the carrier line A or B that has been selected by the base router 101 when the center router 101 has received data from the base side before this transmission.

In the example shown in FIG. 1, (1) the base router 101 selects the carrier line B for transmitting data from a base host 102 (IP address: "a"); (2) the center router 100 learns correlation between the IP address; "a" and the carrier line B referring to a routing table; and (3) the center router 100 transmits data to the base host 102 (IP address: "a") to the carrier line B based on the correlation. Thereby, the data transmission from the center side to the base side can be executed through the carrier line B having a wide available band. Thus, effective load distribution suitable for the services of the carrier lines A and B can be executed.

Figure 2:
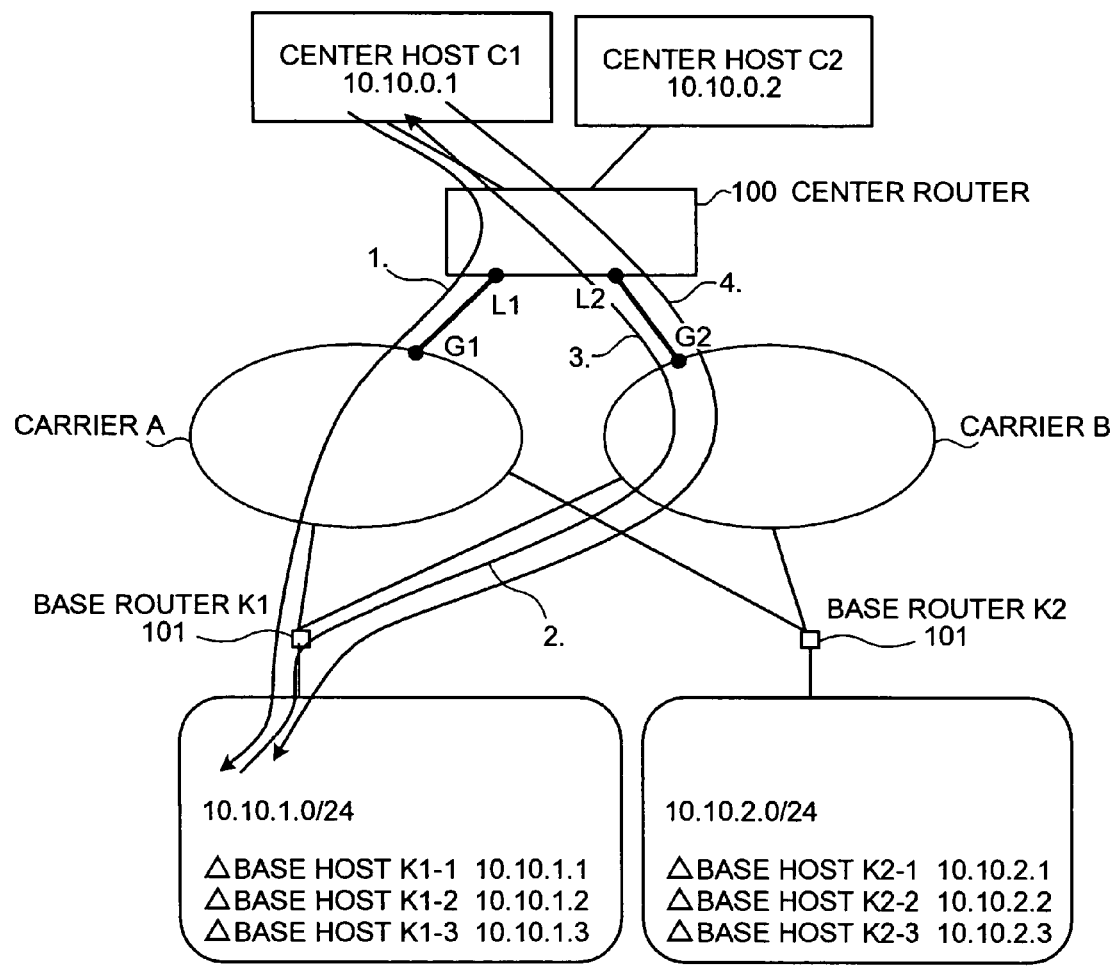
FIG. 2 is a schematic of a route controlling apparatus according to a first embodiment of the present invention.

FIG. 2 is a schematic of a route controlling apparatus according to a first embodiment of the present invention. In a model network shown in FIG. 2, two bases and two internet protocol (IP) networks are arranged for simplicity of the description.

On the center side, two center hosts C1, C2 are connected through the center router 100. The center router 100 is connected with lines L1, L2. The line L1 is connected with the carrier A through a gateway address G1. The line L2 is connected with the carrier B through a gateway address G2. In the following description, the lines L1, L2 are called "transmission lines" or "center lines" as appropriate. On the base side, two base routers 101 (K1, K2) are disposed and respectively administer network addresses different from each other. These base routers K1, K2 can be connected selectively with either the carriers A or B. Under the base router K1, plural base hosts (terminals such as PCs) K1-1 to K1-3 are disposed. Under the base router K2, plural base hosts (terminals such as PCs) K2-1 to K2-3 are disposed.

FIG. 3 illustrates a basic routing table provided to the center router. As to creation of this basic routing table 300, the table 300 can be created dynamically by static registration using commands or dynamic routing software, and can be created using the existing techniques. Network addresses under the base routers K1, K2 are registered in the "destination address/mask length" column. Two gateway addresses G1, G2 and the transmission lines L1, L2 corresponding to the network addresses are registered.

FIG. 4 illustrates a load distribution routing table provided in the center router. The center router 100 creates dynamically a load distribution routing table 400 shown in FIG. 4. This load distribution routing table 400 is a routing table for executing the center load distribution of a base-dependent type. In the table, respective correlations among: transmission origin addresses of the center hosts C1, C2; destination addresses of the base hosts K1-1 to K1-3, K2-1 to k2-3 on the base side; the gateway addresses G1, G2; and the transmission lines L1, L2 are created. A center load distribution function of a base-dependent type can be realized by this load distribution routing table 400.

Figure 5A:
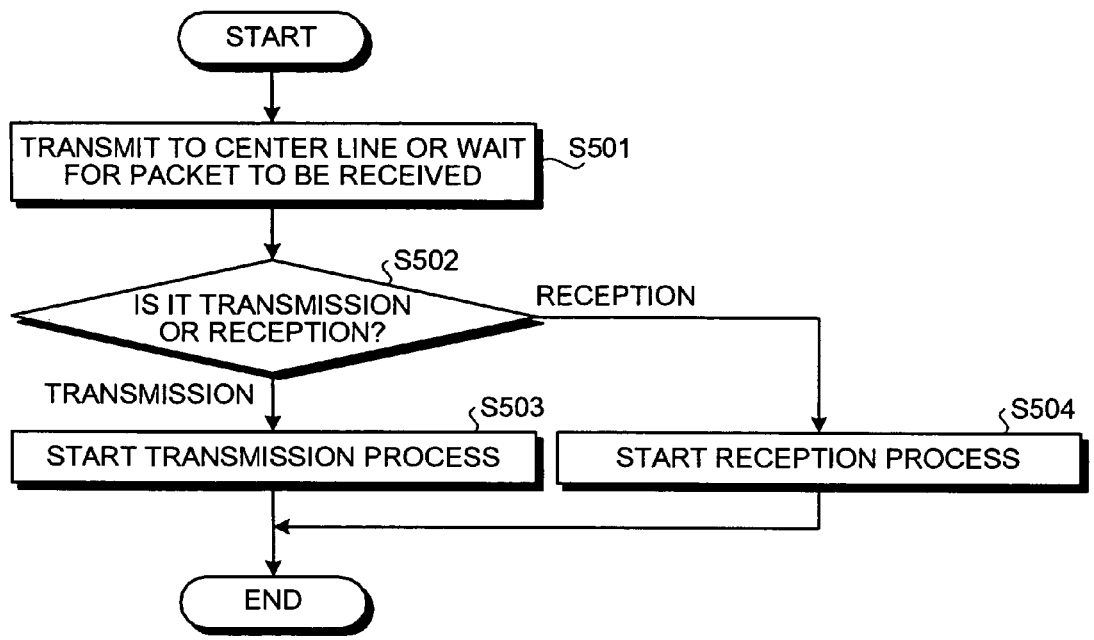
FIG. 5A is a flowchart of a selecting process of the center router according to a first embodiment of the present invention.

FIG. 5A is a flowchart of a selecting process for activated process by the center router according to the first embodiment. The center router 100 waits for packets to be transmitted directed to the center lines L1, L2 or packets to be received (step S501). For transmission (step S502: transmission), a transmission process is started up (step S503) and, for reception (step S502: reception), a reception process is started up (step S504). These route controlling operations are executed by a controlling unit, not shown, provided to the center router 100. Each of the tables above consists of a storing unit, not shown, such as a memory, etc. Entries are created by the controlling unit or inputting by operation and are referred to by the controlling unit for selecting a route.

Figure 5B:
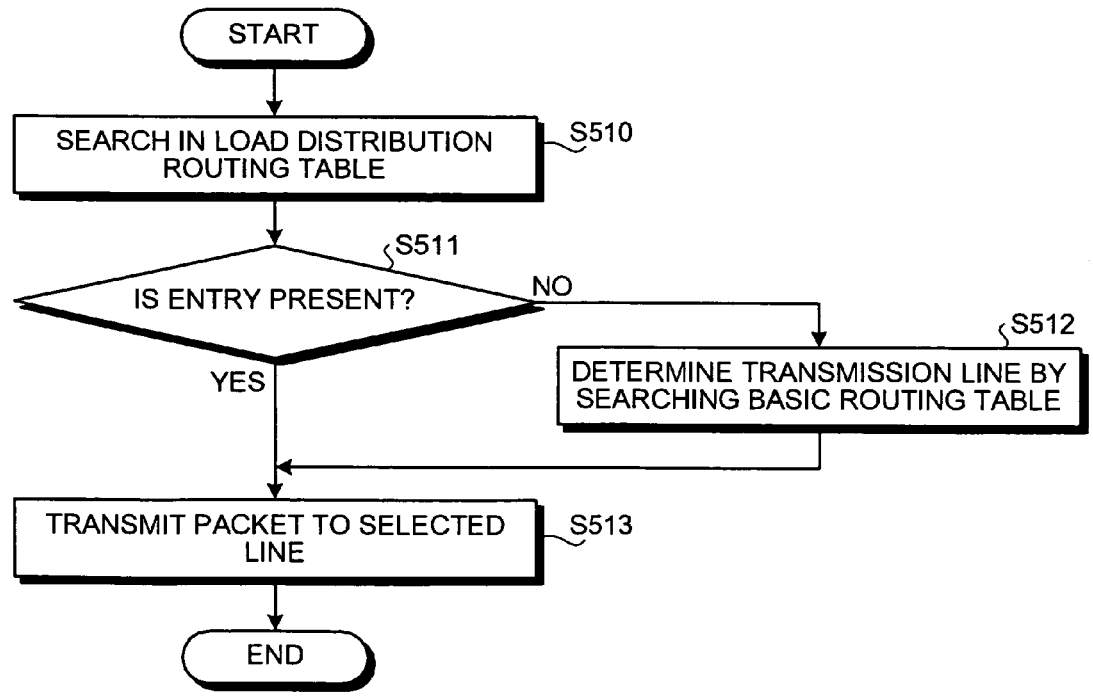
FIG. 5B is a flowchart of a transmitting process of the center router according to the first embodiment.

FIG. 5B is a flowchart of the transmission process of the center router according to the first embodiment, and illustrates the contents of the transmission process started up in FIG. 5A. When the center router 100 has received data (a packet) directed to the base host from the center host after the transmission process was started up, the center router 100 searches whether an entry corresponding to the data is present in the load distribution routing table 400 of FIG. 4 (step S510). When the entry is present (step S511: YES), the packet is transmitted to a selected line (step S513) and one session of transmission is ended. When the entry is not present (step S511: NO), a transmission line is determined by searching for the entry in the basic routing table 300 of FIG. 3 (step S512), and thereafter, the transmission at S513 is executed and one session of transmission is ended.

Figures 5C, 6:
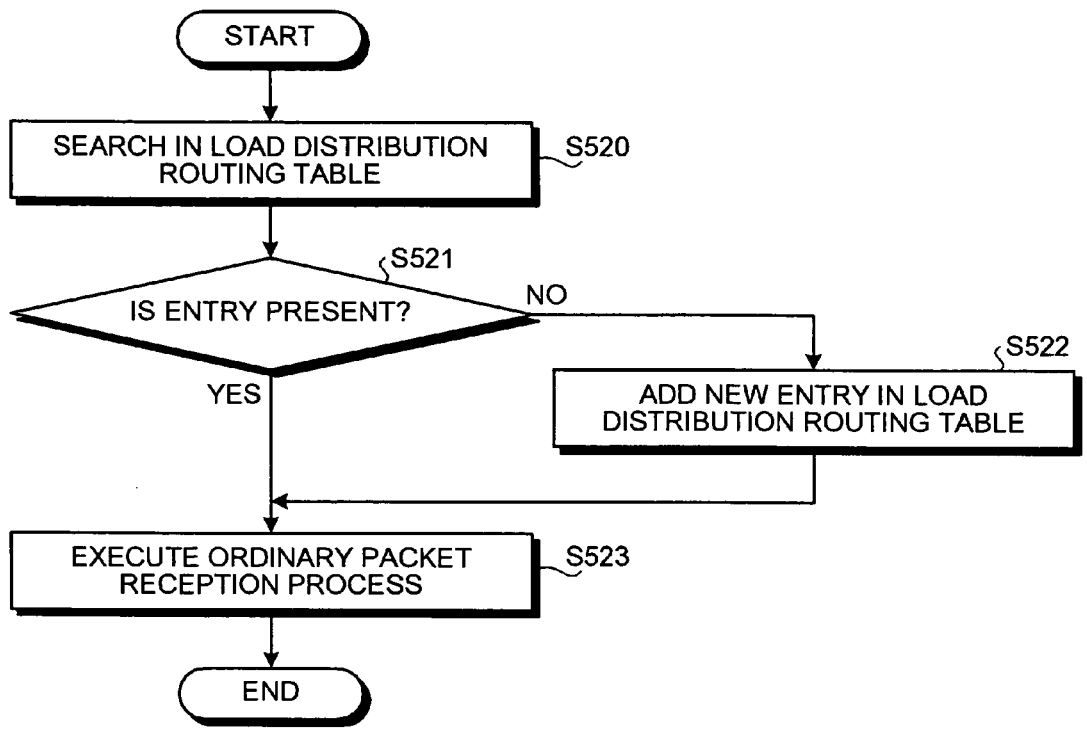
FIG. 5C is a flowchart of a receiving process of the center router.
FIG. 6 is a schematic for illustrating another example of the load distribution routing table.

FIG. 5C is a flowchart of the reception process by the center router according to the first embodiment and illustrates the contents of the reception process started up in FIG. 5A. When the center router 100 has received data (a packet) directed to the center host from the base host after the reception process is started up, the center router 100 searches whether an entry corresponding to the data is present in the load distribution routing table 400 of FIG. 4 (step S520). When the entry is present (step S521: YES), an ordinary packet reception process is executed to this packet (step S523) and one session of transmission is ended. When the entry is not present (step S521: NO), a new entry corresponding to the data is added to the load distribution routing table 400 (step S522) and reception at step S523 is executed, and one session of transmission is ended. The number of entries created in the load distribution routing table 400 is the number of: the center hosts×the number of the carriers×the number of the base hosts, and therefore, 2×2×6=24 entries are created in the configuration shown in FIG. 2.

A specific example of the above route control will be described using FIG. 2. The reference numerals 1 to 4 are given following the procedure of the controlling process. In the initial state, no entry is present in the load distribution routing table 400 shown in FIG. 4.

1. When the center router 100 has received data directed to the base host K1-1 from the center host C1, the center router 100 refers to the load distribution routing table 400. Because no entry is present in the load distribution routing table 400 in the initial state, the center router 100 refers to the basic routing table 300 shown in FIG. 3 and selects the transmission lines L1, L2 suitable for an address (10.10.1.1) of the base host K1-1. These two lines L1 and L2 are candidates in this example, and any one of the existing techniques such as, for example, the operation of the equal-cost-multi-path or the load of the center lines, etc., can be selectively used as to determining which one of these lines is used. In the example of FIG. 2, the line L1 of the carrier A is selected.

2. The base router 101 (K1) transfers a packet directed to the base host K1-1, that has been received through the carrier A, to the base host K1-1. At this time, it is assumed that, when the base router K1 has received a response packet directed to the center host C1 from the base host k1-1, the base router K1 selects a base line of the carrier B having a small line load based on the line load state of terminal lines in the direction from the center to the base and transmits the packet to the center host C1.

3. When the center router 100 has received a packet directed to the center host C1 from the base host k1-1, from the center line of the carrier B, the center router 100 adds a new entry shown in the load distribution routing table 400 (transmission origin address (the center host C1): 10.10.0.1, destination address (the base host K1-1): 10.10.1.1, gateway address: G2, and the transmission line: L2).

4. Thereafter, when the center router 100 has received a successor packet directed to the base host K1-1 from the center host C1, the center router 100 refers to the load distribution routing table 400. Because the new entry created in the item 3 above is present in the table 400, the center router 100 transmits this successor packet to the center line L2 of the carrier B according to the contents of the setting created. After this, communication through a carrier switched to the carrier B having a small load of the base line can be executed between the center host C1 and the base host K1-1.

According to the above route control, the base router grasps the load state of the base lines, selects a base line having a small load according to this load state, and transmits a packet to the center host. As to the packet transmission to the bases, the center router on the center side selects a center line that leads to a base line selected by the base router and transmits the packet such that the packet is directed to a base line selected by the base router. As described above, the center router can grasp the load state of the base lines without needing any special information exchanging protocol between the center router and the base router, and no line load is caused to be generated in the network. According to the above configuration, because the load distribution can be realized in combinations of the center hosts and the base hosts, flexible load distribution can be realized even in a network having a large number of apparatuses accommodated on the host side.

FIG. 6 illustrates another example of the load distribution routing table. A load distribution routing table 600 shown in FIG. 6 may be configured by adding a TCP/IP port number (for example, the socket number) to each of the items shown in FIG. 4. In this case, the number of entries created in the load distribution routing table 600 is the number of: the center hosts×the number of the carriers×the number of the base hosts×the number of ports, and therefore, 2×2×6×N=24×N entries are created in the configuration shown in FIG. 6.

In this manner, whether line distribution is executed for each application can be set by controlling the route by combining items including even the port numbers. For example, even for communication between a Web server on a center side and a browser of a host on a base side, line distribution by changing port numbers for each Webpage is enabled. By distributing lines, compared to the communication by a multiple data communication path on one line corresponding to the number of ports, the line load can be reduced because plural lines are used in the communication. By correlating the center hosts respectively with the center lines combined respectively with a port number (one center host to one center line, two center hosts to one center line, etc.), the center host functions can be realized for each port number, and therefore, more flexible system construction is enabled.

Figure 7:
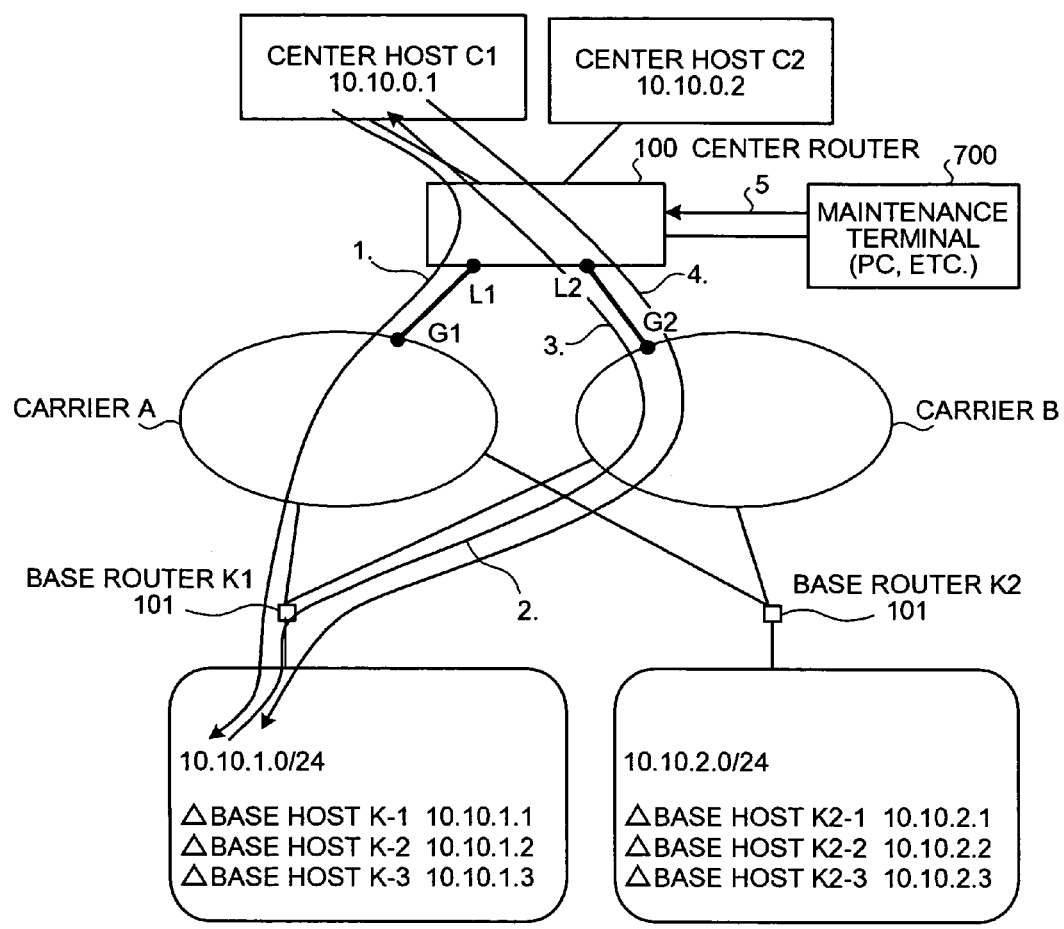
FIG. 7 is a schematic of a route controlling apparatus according to a second embodiment of the present invention.

FIG. 7 is a schematic of a route controlling apparatus according to a second embodiment according to the present invention. The same components as those in the first embodiment (FIG. 2) are given the same reference numerals. According to the configuration of the second embodiment, the center router 100 is connected with a maintenance terminal 700 such as a personal computer, and conditions that can not be coped with by applying the load distribution described in the first embodiment can be set.

Figure 8:
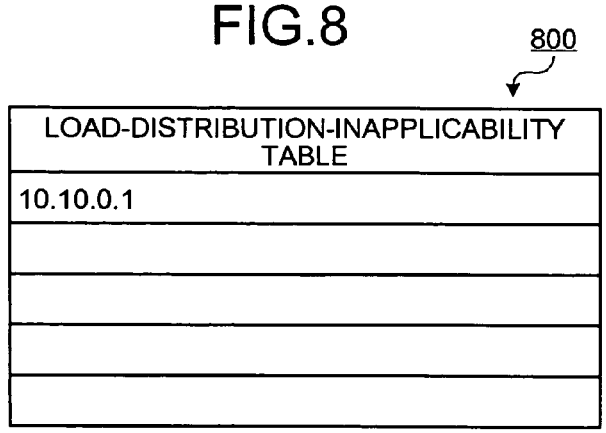
FIG. 8 is a schematic for illustrating an example of a load-distribution inapplicability table.

FIG. 8 illustrates a load-distribution inapplicability table. The center router 100 is further provided with a load-distribution inapplicability table 800, in addition to the basic routing table 300 (see FIG. 3), and the load distribution routing table 400 (see FIG. 4) or the load distribution routing table 600 (see FIG. 6) described above. In this load-distribution inapplicability table 800, an IP address of a host that is inapplicable to the load distribution described above is set. In the example shown, an IP address, (10.10.0.1) of the center host C1 is set. This center host C1 is inapplicable to the load distribution.

In the route controlling operations in the second embodiment, the contents of the selecting process are same as those of the first embodiment (see FIG. 5A) and the contents of the reception process are same as those of the first embodiment (see FIG. 5C) and, therefore, the description thereof is omitted.

Figure 9:
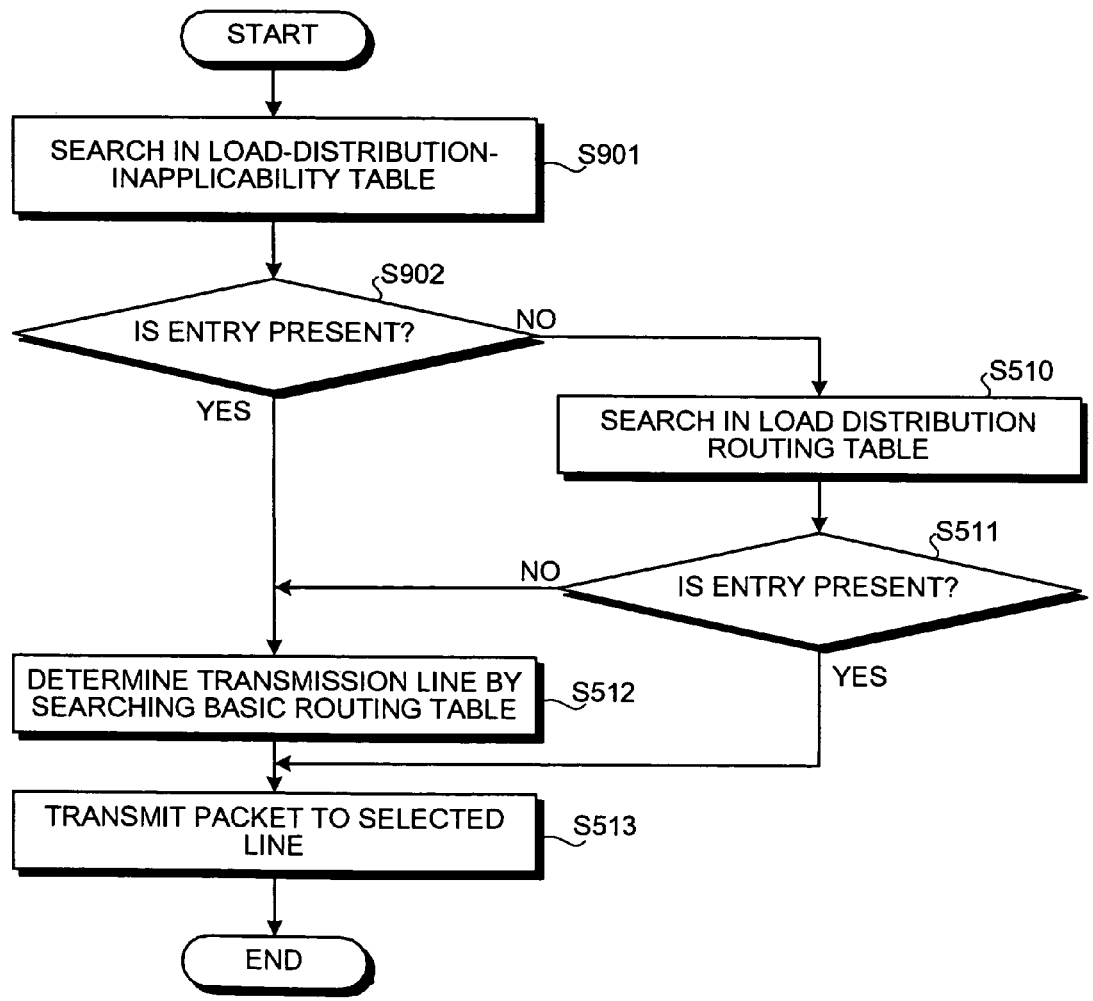
FIG. 9 is a flowchart of a transmitting process of the center router according to the second embodiment.

FIG. 9 is a flowchart of a transmission process by the center router in the second embodiment. The same processes as those in the first embodiment (see FIG. 5B) are given the same reference numerals. Different process is that searching in the load-distribution inapplicability table 800 (step S901) is executed at the start of the transmission process. The search has been executed and, when the entry is present (step S902: YES), step S512 is executed (a transmission line is determined by retrieving the corresponding entry in the basic routing table 300) and, when the entry is not present (step S902: NO), step S510 is executed (the load distribution routing table 400 or 600 is searched to check whether the corresponding entry is present in the table).

Thereby, the same processes as those in FIG. 2 are executed for the procedures 1 to 4 shown in FIG. 7. For transmission from the center host C1 to the base host K1-1, the center router 100, as item 5, searches the load-distribution inapplicability table 800 shown in FIG. 8 according to the setting of the maintenance terminal 700. In the example shown in FIG. 8, the center host C1 (IP address: 10.10.0.1) is present as an entry of the load-distribution inapplicability table 800. Therefore, the transmission line is determined based on the basic routing table 300 (see FIG. 3) without searching in the load distribution routing table 400 (see FIG. 4) or the load distribution routing table 600 (see FIG. 6). When the center host C1 (IP address: 10.10.0.1) is not present as an entry of the load-distribution inapplicability table 800, the corresponding transmission line is determined by searching in the load distribution routing table 400 (see FIG. 4) or the load distribution routing table 600 (see FIG. 6).

As described above, by registering information that is inapplicable to the load distribution in the load-distribution inapplicability table 800 in advance, for example, when a specific center host needs to transmit a large amount of data for a long time and guaranteeing a band, communication can be executed using a communication line (in the example of the configuration of FIG. 23, the carrier A that guarantees a band) set fixed in advance assuming this center host to be a host that is inapplicable to the load distribution shown in the first embodiment.

In the above configuration, the center host that is applicable with the load distribution is judged by setting the load-distribution inapplicability table 800 separately from and in addition to the setting of the load distribution routing tables 400, 600. Not limiting to the above configuration, the load distribution routing table 400 or 600 described in FIG. 4 or 6 may be configure to be registered fixedly in itself a specific controlling entry that is inapplicable to the load distribution, as a command.

Figure 10:
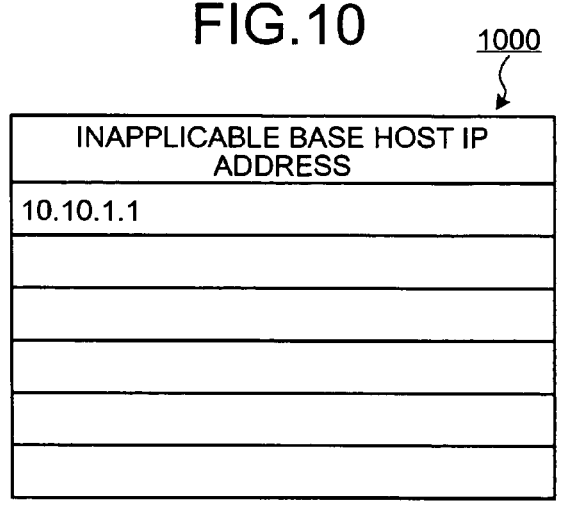
FIG. 10 is a schematic for illustrating another example of the load-distribution inapplicability table.

FIG. 10 illustrates another example of the load-distribution inapplicability table. In the load-distribution inapplicability table 800 (see FIG. 8) described above, the setting indicating inapplicability with the load distribution is configured to be set for the center host side. However, the setting may also be configured to be set for the base host side as in a load-distribution inapplicability table 1100 shown in FIG. 10. In the example shown in FIG. 10, the base host K1-1 (IP address: 10.10.1.1) is set as a host that is inapplicable to the load distribution. Thereby, when a specific base host is scheduled to receive a large amount of data for a long time, this base host can be a host that is inapplicable to the load distribution shown in the first embodiment. A band for communication can be guaranteed and a wide band can be expected for each base host.

Figure 11:
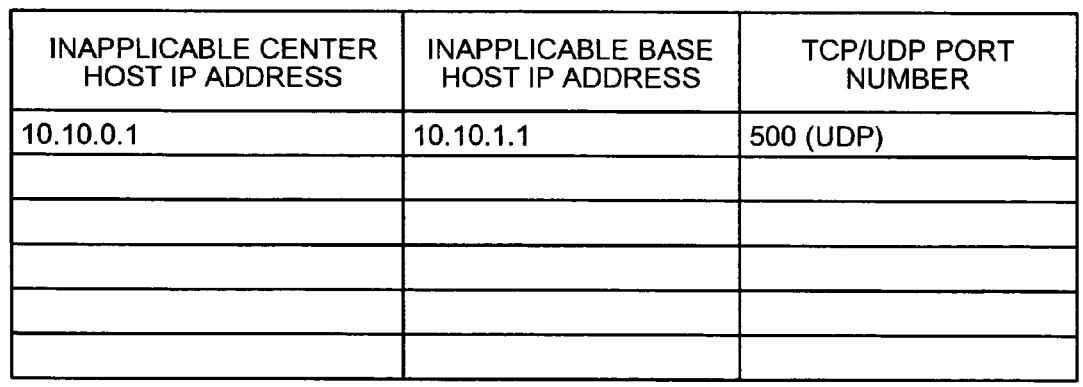
FIG. 11 is a schematic for illustrating another example of the load-distribution inapplicability table.

FIG. 11 illustrates another example of the load-distribution inapplicability table. As the configuration of the load-distribution inapplicability table 1100 shown in FIG. 11, combinations of an IP address of a center host that is inapplicable to the load distribution, an IP address of a base host, and a communication-use transmission control protocol/user datagram protocol (TCP/UDP) port number are set. As these combinations: 1. a combination of an IP address of a center host and an IP address of a base host; 2. a combination of an IP address of a center host and a communication-use TCP/UDP port number; 3. a combination of an IP address of a base host and a communication-use TCP/UDP port number; and 4. a combination of an IP address of a center host, an IP address of a base host, and a communication-use TCP/UDP port number, etc., can be considered.

According to the above configuration, for example, whether a center line is determined fixedly with a combination of an IP address and a port number, or the load is distributed can be selected for each application. More specifically, registration of hosts that are inapplicable to the load distribution can be executed for each type of application that needs quality assurance or for each application type that needs performance expectation and, therefore, flexible route control can be realized.

FIG. 12 illustrates another example of the load-distribution inapplicability table. According to the configuration of the load-distribution inapplicability table 1100 shown in FIG. 11 described above, necessity of registering entries that are inapplicable to the load distribution one by one is generated. At maximum, "the number of the center hosts×the number of the carriers×the number of the base hosts×the number of ports N" entries must be input using commands, and therefore, the number of times of input by operation for entries is tremendous. In the setting shown in FIG. 12, as to a transmission origin TCP/UDP port number, the transmission origin port number of TCP (or UDP) of a packet directed from a center host to a base host is set and, as to IP addresses of load-distribution-inapplicability center hosts and base hosts, a general setting ("ANY" command) that can handle all IP addresses is employed.

In the example of a load-distribution inapplicability table 1200 shown in FIG. 12, as to an application on the center side that uses "500" (UDP) as the transmission origin TCP/UDP port number thereof, regardless of a center host or a base host, communication that uses a fixed communication line based on the basic routing table 300 (see FIG. 3) as a host that is inapplicable to the load distribution can be executed.

According to the above configuration, by setting "ANY" that handles all the IP addresses of the center hosts that are inapplicable to the load distribution and the base hosts, all the IP addresses can be handled for the center hosts that are inapplicable to the load distribution and the base hosts and, therefore, the labor of registering respectively the IP addresses of the center hosts and the base hosts one by one can be omitted. Registration of the inapplicability with the load distribution can be executed easily for each type of application on the center side that needs quality assurance or for each application type on the center side that needs performance expectation and, therefore, flexible route control can be realized.

FIG. 13 illustrates another example of the load-distribution inapplicability table. In the setting of a load-distribution inapplicability table 1300 shown in FIG. 13, as to a transmission destination TCP/UDP port number, the transmission destination port number of TCP (or UDP) of a packet directed from a center host to a base host is set, and as to IP addresses of load-distribution-inapplicability center hosts and base hosts, a setting ("ANY" command) that can handle all IP addresses is employed.

In the example of FIG. 13, as to an application on the base side that uses "500" (UDP) as the transmission destination TCP/UDP port number thereof, regardless of a center host or a base host, communication that uses a fixed communication line based on the basic routing table 300 (see FIG. 3) as a host that is inapplicable to the load distribution can be executed.

According to the above configuration, by setting "ANY" that handles all the IP addresses of the center hosts that are inapplicable to the load distribution and the base hosts, all the IP addresses can be handled for the center hosts that are inapplicable to the load distribution and the base hosts. Therefore, the labor of registering respectively the IP addresses of the center hosts and the base hosts one by one can be omitted. Due to the setting of the transmission origin port numbers or transmission destination port numbers, registration of the inapplicability with the load distribution can be executed easily for each type of application on the base side that needs quality assurance or for each application type on the base side that needs performance expectation and, therefore, flexible route control can be realized.

FIG. 14 illustrates another example of the load-distribution inapplicability table. A load-distribution inapplicability table 1400 shown in FIG. 14 is an example that integrates the settings in the load-distribution inapplicability tables (FIGS. 8, 10, 11, 12, and 13) described in the second embodiment into one table.

Describing each entry, as to the load-distribution-inapplicable center host IP address set to be the center host C1 (IP address: 10.10.0.1) and the load-distribution-inapplicable base host IP address set to be the base host K1-1 (IP address: 10.10.1.1), the transmission origin TCP/UDP port number 500 (UDP) and the transmission destination TCP/UDP port number 500 (UDP) are inapplicable to the load distribution. As to the load-distribution-inapplicable center host IP address set to be the center host C1 (IP address: 10.10.0.1) and the load-distribution-inapplicable base host IP address set to be the base host K2-1 (IP address: 10.10.2.1) shown in FIG. 7, the transmission origin TCP/UDP port number 30 (UDP) is inapplicable to the load distribution. As to the load-distribution-inapplicable center host IP address set to be the center host C2 (IP address: 10.10.0.2) shown in FIG. 7 and the load-distribution-inapplicable base host IP address is set to be "ANY" command, the transmission destination TCP/UDP port number 1000 (TCP) is inapplicable to the load distribution. As to the setting for which load-distribution-inapplicable center host IP address is set to be "ANY" and the load-distribution-inapplicable base host IP address is set to be "ANY", the transmission destination TCP/UDP port number 125 (TCP) is inapplicable to the load distribution.

According to the above configuration, settings can be made using one table for the wide variety of requests such as the cases where quality assurance is executed, where performance improvement is aimed, where a line is determined for each IP address, where a line is determined for each application type, etc., and, therefore, the route control corresponding to the requested communication quality, etc., can be executed with a simple setting.

Figure 15:
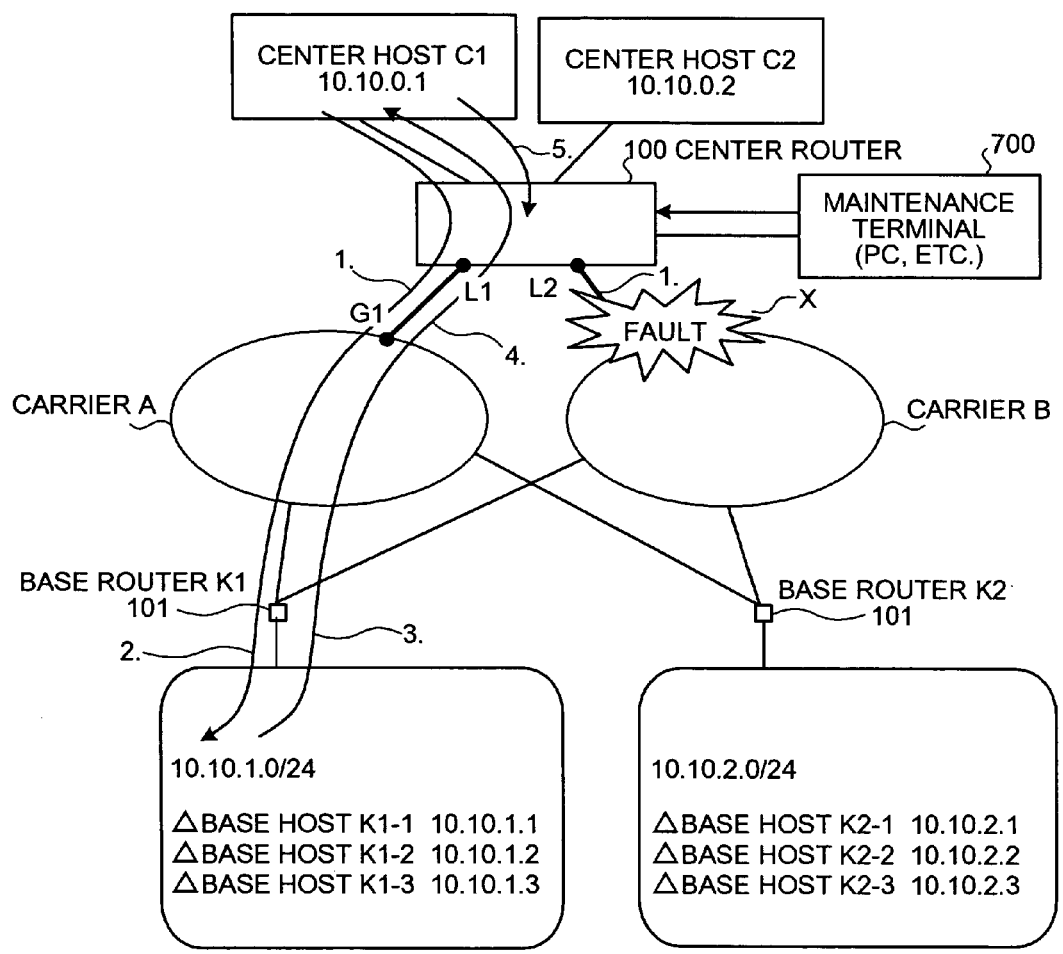
FIG. 15 is a schematic of a route controlling apparatus according to a third embodiment of the present invention.
Figure 16:
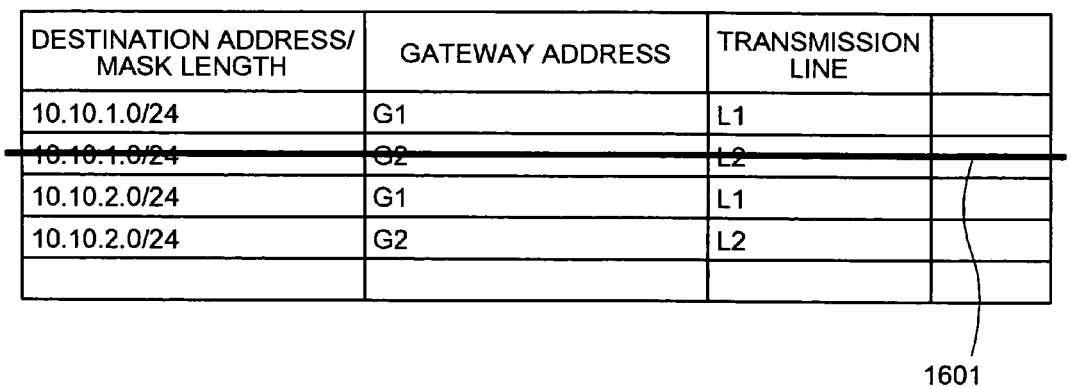
FIG. 16 is a schematic for illustrating a basic routing table according to the third embodiment.
Figure 17:
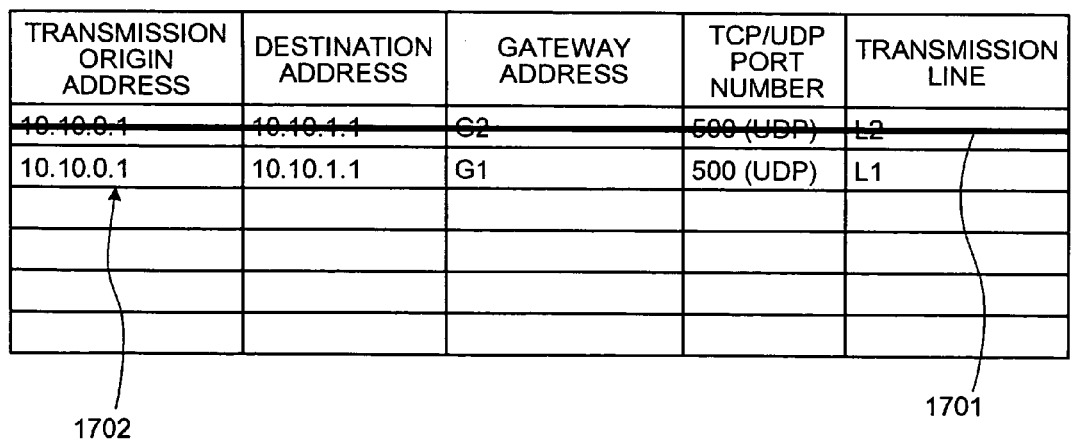
FIG. 17 is a schematic for illustrating a load distribution routing table according to the third embodiment.

FIG. 15 is a schematic of a route controlling apparatus according to a third embodiment of the present invention. The route controlling apparatus according to the third embodiment is configured to execute the route control that can cope with occurrence of a fault on a communication line, and is provided with a fault monitoring unit not shown. The same components as those in the second embodiment (FIG. 7) are given the same reference numerals. The same route control (see FIG. 9) as that of the second embodiment is executed. FIG. 16 illustrates a basic routing table 300 (having the same setting contents as that of FIG. 3) in the third embodiment. FIG. 17 illustrates a load distribution routing table 600 (having the same setting contents as that of FIG. 6) in the third embodiment. Though not shown, a setting for a load-distribution inapplicability table (for example, FIG. 14) is also made.

Figure 18A:
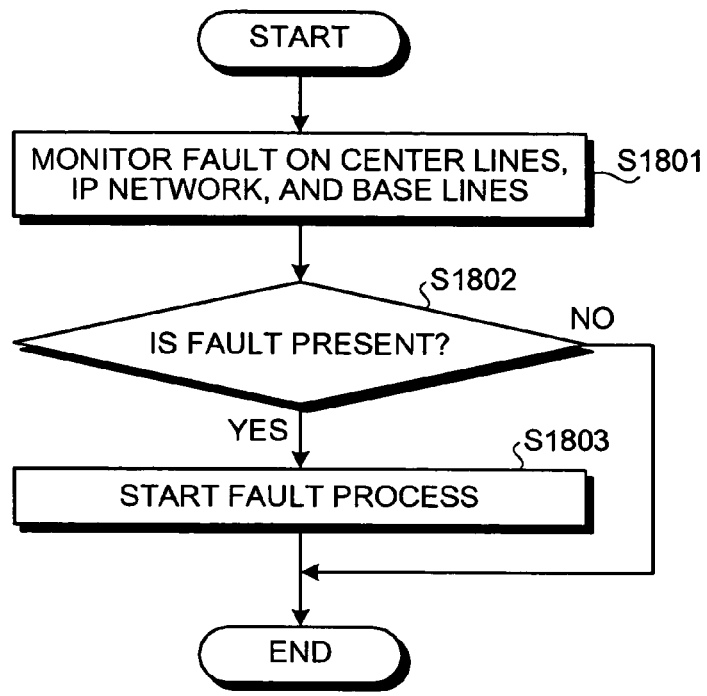
FIG. 18A is a flowchart of a fault monitoring process of the center router according to the third embodiment.

The control executed when a fault has been detected on a route will be described using FIGS. 18A and 18B. FIG. 18A is a flowchart of a fault monitoring process of the center router in the third embodiment. The center router 100 monitors occurrence of faults on the center lines, the IP network (the carriers A, B), and the base lines (step S1801). Faults may occur on not only the lines but also apparatuses disposed on the lines and occurrence of faults on these apparatuses can also be monitored (detected). When no fault has been occurred on any of these lines and the network (step S1802: NO), one session of monitoring is ended. After this, the process at step S1801 is executed again. When occurrence of a fault on any of the center lines, the IP network, and the base lines has been detected (step S1802: YES), a fault process startup is executed (step S1803) and one session of monitoring is ended.

Figure 18B:
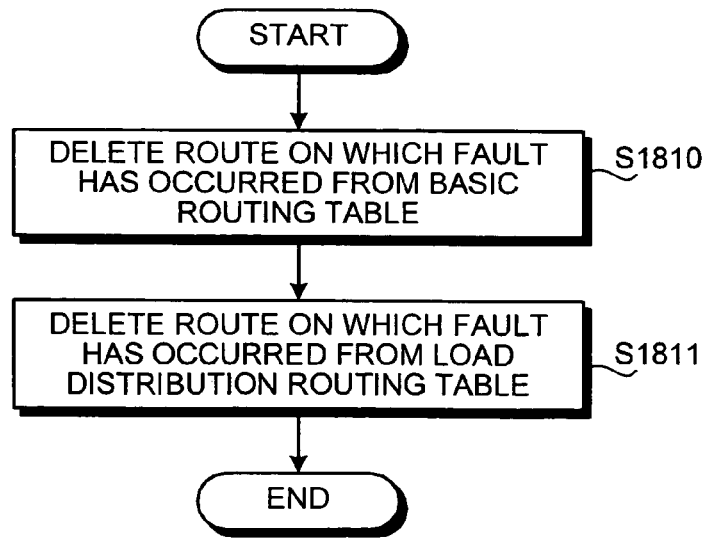
FIG. 18B is a flowchart of a fault process according to the third embodiment at the time of occurrence of a fault.

FIG. 18B is a flowchart of a fault process at the time of occurrence of a fault according to the third embodiment. As the fault process, the route on which the fault has occurred is deleted from the basic routing table 300 (step S1810), the route on which the fault has occurred is deleted from the load distribution routing table 600 (step S1811), and the process is ended.

Referring to FIG. 15, it is assumed that route control is executed using the basic routing table 300 and the load distribution applicability routing table 600.

1. When the center router 100 has received a packet directed to the base host from the center host, the center router 100 refers to the load-distribution inapplicability table 1400 shown in FIG. 14. Whether the packet has been received from the center host that is applicable with the load distribution function is judged. When the packet has been received from the center host C1 that is applicable with the load distribution, the center router refers to the load distribution routing table 600. Because a corresponding entry (having the transmission destination address, IP address: 10.10.0.1 indicating the center host C1) is present in the load distribution routing table 600, according to the setting thereof, the center router is ready to transmit the packet toward the center line L2 (the gateway address: G2) of the carrier B.

In this state, when the center router 100 has detected a fault "X" on the center line as shown in FIG. 15 on a route to be used for transmission (in addition, a fault on the IP network (the carrier B) or the base line can be detected), a target route 1601 on which the fault has been detected is deleted from the basic routing table 300 shown in FIG. 16. Simultaneously, a target route 1701 on which the fault has been detected is also deleted from the load distribution routing table 600 shown in FIG. 17. After this, when the center router 100 has received a successor packet, the center router 100 transmits this packet toward a normal center line (the center line L1).

2. The base router 101 (K1) transfers a packet received through the carrier A to the base host K1-1.

3. When the base router 101 (K1) has received a response packet directed to the center host C1 from the base host K1-1, the base router 101 selects a base line of the carrier A on which no fault has been occurred, and transmits the packet toward the center host C1 using the selected line. Then, communication using the carrier A having lines on which no fault has occurred is executed between the center host C1 and the base host K1.

4. When the center router 100 has received the packet directed to the center host C1 from the base router 101 (K1), from the center line of the carrier A, the center router 100 adds a new corresponding entry 1702 after the route control to the load distribution routing table 600. As shown in FIG. 17, for this new entry 1702, the transmission origin address is 10.10.0.1, the destination address is 10.10.1.1, the gateway address is G1, the TCP/UDP port number is 500 (UDP), and the transmission line is L1.

5. Then, when the center router 100 has received a successor packet directed to the base host K1-1 from the center host C1, as described above, the center router 100 refers to the load-distribution inapplicability table (fro example, FIG. 14) and judges whether the packet has been received from the center host that is applicable with the load distribution. When the packet has been received from the center host that is applicable with the load distribution, the center router 100 refers to the load distribution routing table 600 and transmits the packet toward the center line L1 of the carrier A according to the contents of the corresponding entry. When the packet has been received from the center host that is inapplicable to the load distribution, the center router 100 refers to the basic routing table 300 and selects a transmission line that matches the address of the base host K1-1.

According to the third embodiment, as described in the first embodiment, the center router can grasp the load state of the base lines and can execute route control and, in addition, when a fault has occurred on a line or an apparatus, the entry of the corresponding route is deleted from the routing tables. Therefore, a route that avoids the route on which the fault has occurred can be selected. The route on which communication is executed after the occurrence of the fault is newly registered as an entry of the routing tables. Therefore, communication through this normal route that is the new route and normal apparatuses can be executed. Therefore, the network can be operated without stopping the communication therethrough even when a fault has occurred in the network.

The fourth embodiment of the present invention is configured to detect a header of an upper protocol and to select a different route for each communication protocol type for each of specific communication protocols that can not be identified the protocol type thereof using the port number of TCP or UDP.

FIG. 19 illustrates a load distribution routing table of the center router according to the fourth embodiment. A first entry of this load distribution routing table 1900 is the same communication protocol (TCP/UDP) as that of the first embodiment (see FIG. 6). A second entry is a real-time transport protocol (RTP) communication protocol (IP protocol) different from the first protocol. The RTP communication protocol is a protocol for sound communication on the IP protocol. This RTP communication protocol is a protocol for which the protocol type can not be identified based on the port number as UDP and TCP. However, the load distribution as described above is enabled by checking an upper protocol (RTP protocol) header.

When the center router 100 has received a packet directed to the center host C2 from the base host K1-2, from the center line of the carrier B, the center router 100 adds a second entry to the load distribution routing table 1900. For the second entry of FIG. 19, the transmission origin address (the center host C2) is 10.10.0.2, the destination address (the base router K1-2, see FIG. 15, etc.) is 10.10.1.2, the gateway address is G2, the TCP/UDP port number is RTP, and the transmission line is L2. RTP is used for sound data and image data, etc., of streaming contents.

FIG. 20 illustrates a load-distribution inapplicability table according to the fourth embodiment. Entries from a first entry down to a fourth entry of a load-distribution inapplicability table 2000 shown in FIG. 20 are same as the registered contents described in the second embodiment (see FIG. 14). For a fifth entry, the load-distribution-inapplicable center host IP address (the center host C2) is 10.10.0.2, the load-distribution-inapplicable base host IP address (the base host K1-2) is 10.10.1.2, the transmission origin TCP/UDP port number is RTP, and the transmission destination TCP/UDP port number is RTP.

FIG. 21 illustrates an IP protocol registration table according to the fourth embodiment. In the fourth embodiment, this IP protocol registration table 2100 is newly used. This IP protocol registration table 2100 is provided to distribute the load of the lines for not only the port numbers of TCP/UDP but also the IP protocols. For an entry in the example of FIG. 21, the center host IP address (center host C2) is 10.10.0.2, the base host IP address (the base host K1-2) is 10.10.1.2, the transmission origin IP protocol number is RTP, and the transmission destination IP protocol number is RTP. In this load distribution routing table 1900, "ANY" can be set for each of the center host IP address and the base host IP address (see FIG. 12 for the example of setting "ANY"). By setting "ANY", the labor of registration by operation for entries can be omitted.

When the center router 100 has received a packet directed to the center host C1 from the base router 101 (K1, K2), from the center lines of the carriers A, B, the center router 100 adds a corresponding new entry to the load distribution routing table 1900 shown in FIG. 19. In executing this new entry, when an entry of the IP protocol is registered in the IP protocol registration table 2100 shown in FIG. 21, a new entry supporting the IP protocol is registered in the load distribution routing table 1900. The detailed process will be described below.

Figure 22:
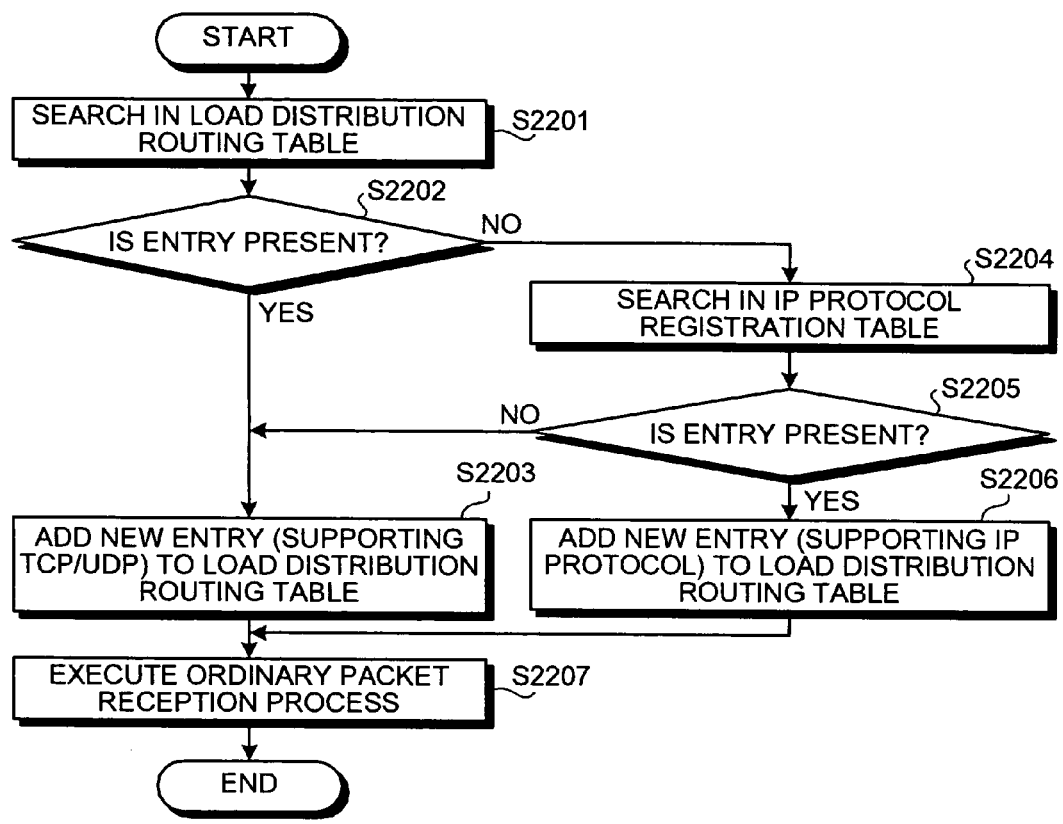
FIG. 22 is a flowchart of a receiving process of the center router according to the fourth embodiment.

FIG. 22 is a flowchart of a reception process by the center router in the fourth embodiment. The contents of a transmission process executed by the center router 100 are same as those in the second embodiment (see FIG. 9) and the description thereof is omitted.

In FIG. 22, in the reception process executed by the center router 100, when the center router 100 has received data (a packet) addressed to the center host from the base host, the center router 100 searches as to whether a corresponding entry is present in the load distribution routing table 1900 (step S2201). When the entry is present (step S2202: YES), a new entry (supporting TCP/UDP) is added to the load distribution routing table 1900 (step S2203) and the ordinary packet reception process is executed to this packet (step S2207), and one session of reception is ended.

When the entry is not present in the load distribution routing table (step S2202: NO), the IP protocol registration table 2100 is searched (step S2204). When the entry of the IP protocol is not present in the IP protocol registration table 2100 (step S2205: NO), the process is moved to step S2203 because the entry is not of the IP protocol. When the entry of the IP protocol is present in the IP protocol registration table 2100 (step S2205: YES), a new entry (supporting the IP protocol) is added to the load distribution routing table 1900 (step S2206), the ordinary reception process is executed to this packet (step S2207), and one session of reception is ended. The load distribution routing table 1900 that has been added with the entry during the above reception process is a target of a search during the transmission process (see, for example, FIG. 9) from the center router 100 to the base routers K1, K2.

According to the fourth embodiment described above, the network is configured to register in advance a specific communication protocol using the IP protocol registration table and to add another entry for each communication protocol to the load distribution routing table during the reception process. Therefore, for each of specific communication protocols that can not be identified the protocol type thereof using the port number of TCP or UDP, different route control for each of the communication protocol types can be executed by detecting a header of an upper protocol. For example, route control that distributes the load of ordinary texts, file data, etc., to the communication protocol of TCP/UDP can be executed as well as route control that distributes the load to the IP protocol such as sound, and image data, can be executed. Thereby, occurrence of transmission delay of transmitted packets for each communication protocol can be prevented. Delay of analysis and processing of the RTP protocol can be prevented. Therefore, load distribution corresponding to the various communication protocols can be easily executed.

According to the first to the fourth embodiment described above, the center router can use the line that has been used by the base router for transmission, for sending packets. Therefore, the line that is advantageous to the base side can be selected also for packet transmission from the center side. At this time, even the port number on the center side or base side can be identified. Therefore, the load distribution can be executed for, for example, each web page.

When the load distribution of the lines is not applied, for example, band-guaranteed lines also can be used fixedly. Therefore, depending on the presence or absence of the setting of the IP addresses of the center host or the base host, whether the load distribution of the lines is executed for each of these hosts, or band guarantee is executed can be selected. Similarly, depending on the presence or absence of the setting of the port numbers of the center host and the base host, whether the load distribution of lines is executed for each application or band guarantee is executed can be selected.

Figure 23:
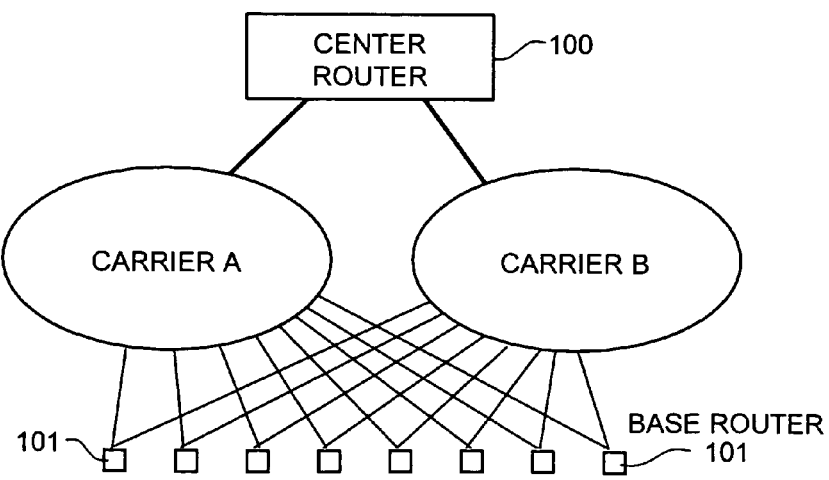
FIG. 23 is a schematic of a network having a duplicated carrier.

As described using, for example, FIG. 23, in a redundant configuration that combines the carriers A, B respectively having different services, the lines can be effectively utilized while the characteristics of each service can be best utilized, by executing the load distribution.

The procedure of the route control in the first to the fourth embodiment can be realized by executing a program prepared in advance on a computer such as a personal computer, a work station, etc. This program is recorded in a computer-readable recording medium such as a hard disk, a flexible disk, a compact-disc read-only memory (CD-ROM), a magneto optical (MO) disk, a digital versatile disk (DVD), etc., and is executed by being read from the recording medium by the computer. This program may be a transmission medium capable of being distributed through a network such as the Internet.

According to the embodiments described above, a communication route for transmission of data from a center side can be determined based on a state of lines on the base side, thereby effectively using the lines corresponding to capacities and types of services thereof.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A route controlling apparatus provided on a center side in a network in which the center side and a base side are connected by a plurality of different carriers, the route controlling apparatus comprising:
a load distribution table;
a load-distribution inapplicability table; and
a controlling unit
configured to create a new entry in the load distribution table when data is received by a host on the center side from a host on the base side, wherein in the new entry a carrier selected for transmission of the data by a router on the base side is associated with an address of the host on the base side,
configured to refer to the load-distribution inapplicability table when data is to be transmitted from the host on the center side to the host on the base side, and
configured to select, as a route through which the data is to be transmitted, the carrier in the new entry when the address of the host on the base side is not registered in the load-distribution inapplicability table, while otherwise to select a carrier that is set in advance for the host on the base side.

2. The route controlling apparatus according to claim 1, wherein the controlling unit is configured to create the new entry in which an address of the host on the center side, a gateway address for the carrier, and a transmission line connected to the gateway address are further associated.

3. The route controlling apparatus according to claim 2, wherein the controlling unit is configured to create the new entry in which a port number of the host on the center side is further associated.

4. The route controlling apparatus according to claim 1, wherein
the controlling unit is configured to select the carrier in the new entry when the address of the host on the base side and a port number to be used for transmission of the data are not registered in the load-distribution-inapplicability table.

5. The route controlling apparatus according to claim 4, wherein the controlling unit is configured to detect, for a communication protocol of which a protocol type is not identified based on the port number, a header of an upper protocol, and to execute a route control for the communication protocol.

6. The route controlling apparatus according to claim 1, wherein in the load-distribution-inapplicability table, a command to collectively set all addresses of hosts on the base side is used.

7. The route controlling apparatus according to claim 1, further comprising a fault monitoring unit configured to monitor a fault on routes from the host on the center side to the host on the base side, wherein
the controlling unit is configured to delete an entry that corresponds to a route on which a fault has occurred, from the load distribution table.

8. A route controlling method of a route controlling apparatus provided on a center side in a network in which the center side and a base side are connected by a plurality of different carriers, the route controlling method comprising:
creating a new entry in a load distribution table when data is received by a host on the center side from a host on the base side, wherein the new entry a carrier selected for transmission of the data by a router on the base side is associated with an address of the host on the base side;
referring to a load-distribution inapplicability table when data is to be transmitted from the host on the center side to the host on the base side; and
selecting, as a route through which the data is to be transmitted, the carrier in the new entry when the address of the host on the base side is not registered in the load-distribution inapplicability table, while otherwise selecting a carrier that is set in advance for the host on the base side.

9. A route controlling apparatus provided on a center side in a network in which the center side and a base side are connected by a plurality of different carriers, the route controlling apparatus comprising:
a load distribution table;
a load-distribution inapplicability table; and
a controlling unit
configured to create a new entry in the load distribution table when data is received by a host on the center side from a host on the base side, wherein in the new entry a carrier selected for transmission of the data by a router on the base side is associated with an address of the host on the base side,
configured to refer to the load-distribution inapplicability table when data is to be transmitted from the host on the center side to the host on the base side, and
configured to select, as a route through which the data is to be transmitted, the carrier in the new entry when the address of the host on the center side is not registered in the load-distribution inapplicability table, while otherwise to select a carrier that is set in advance for the host on the center side.

10. The route controlling apparatus according to claim 9, wherein
the controlling unit is configured to select the carrier in the new entry when the address of the host on the center side and a port number to be used for transmission of the data are not registered in the load-distribution inapplicability table.

11. The route controlling apparatus according to claim 10, wherein the controlling unit is configured to detect, for a communication protocol of which a protocol type is not identified based on the port number, a header of an upper protocol, and to execute a route control for the communication protocol.

12. The route controlling apparatus according to claim 9, wherein in the load-distribution-inapplicability table, a command to collectively set all addresses of hosts on the center side is used.

13. A route controlling apparatus provided on a center side in a network in which the center side and a base side are connected by a plurality of different carriers, the route controlling apparatus comprising:
a load distribution table;
a load-distribution inapplicability table; and
a controlling unit
configured to create a new entry in the load distribution table when data is received by a host on the center side from a host on the base side, wherein in the new entry a carrier selected for transmission of the data by a router on the base side is associated with an address of the host on the base side,
configured to refer to the load-distribution inapplicability table when data is to be transmitted from the host on the center side to the host on the base side, and
configured to select, as a route through which the data is to be transmitted, the carrier in the new entry when the address of the host on the center side, the address of the host on the base side, and a port number to be used for transmission of the data are not registered in the load-distribution inapplicability table, while otherwise to select a carrier that is set in advance for the host on the base side.

14. The route controlling apparatus according to claim 13, wherein in the load-distribution-inapplicability table, a command to collectively set all addresses of hosts on the center side or all addresses of hosts on the base side is used.

15. The route controlling apparatus according to claim 13, wherein the controlling unit is configured to detect, for a communication protocol of which a protocol type is not identified based on the port number, a header of an upper protocol, and to execute a route control for the communication protocol.

* * * * *